United States Patent Office 2,988,523
Patented June 13, 1961

2,988,523
RADIATION SHIELDING COMPOSITION AND METHOD OF MANUFACTURE
Archibald M. Erskine, Berkeley, Richard M. Lydon, Richmond, and Lorand Manhart, Albany, Calif., assignors to The California Ink Company, Inc., San Francisco, Calif., a corporation of Delaware
No Drawing. Filed May 12, 1958, Ser. No. 734,402
6 Claims. (Cl. 252—478)

This invention relates to a shielding composition for gamma rays and neutrons, and more particularly to a method of obtaining a uniform dispersion of dense metal in wax whereby a novel radiation shielding composition is produced.

Gamma rays and neutrons emitted from sources such as nuclear reactors present a serious health hazard unless suitable radiation shielding is employed. For example, dense metals, such as lead, are often employed for the absorption of gamma rays, and hydrogen-containing compounds are utilized to provide a shield for neutrons. Generally, large lead and concrete shielding structures are utilized to provide the desired shielding for gamma rays and neutrons. However, such structures are expensive to construct, and they must be quite thick in order to provide the desired shielding effect since they are relatively inefficient.

In order to provide an inexpensive shield for gamma rays and neutrons that can be readily shaped into any desired form, it has been proposed to prepare a dispersion of finely divided dense metal powder, such as lead, in a molten paraffin wax. The resultant dispersion may be molded and cooled to form a solid radiation shield of any desired shape. The dense metal in the dispersion absorbs gamma radiation, and the paraffin wax provides a cheap and efficient neutron absorber because of its high hydrogen content.

However, numerous difficulties have been encountered in producing such a dispersion because the heavy metal tends to settle out of the much lighter liquid wax. This problem is particularly acute when the mixture of liquid wax and lead is poured into a mold and the mixture is no longer agitated. Under such conditions, the dense metal immediately settles to the bottom of the mixture. However, it is of basic importance to have a uniform distribution of dense metal in wax that will provide the same amount of shielding for gamma rays as well as for neutrons.

Although a more uniform dispersion of dense metal in wax can be obtained if the wax is maintained exactly at the temperature range at which it will congeal, it is not practical to hold the wax at this specific temperature under large scale conditions of manufacture because of the impossibility of controlling the temperature of large masses with sufficient accuracy. Also, if the temperature is dropped even slightly below the melting point of the wax, a separate solid phase of the wax is formed which is too hard to permit efficient reincorporation of the lead.

Summarizing this invention, the foregoing difficulties are overcome and a uniform dispersion of dense metal particles in a mineral wax is obtained by incorporating in the mixture of dense metal and molten wax a solid, finely divided, additive selected from the group consisting of silica, group II metal silicates, group III metal silicates, group IV metal silicates, and mixtures thereof. Such silica and metallic silicate additives are referred to hereafter as silica additives. When the wax is maintained between the lowest point in its melting point range and about 15° C. above the highest point in its melting point range, and the finely divided dense metal and silica additive are intermixed into the wax, a uniform dispersion of the metal in wax is obtained. The dense metal remains uniformly dispersed even after the mixing has been stopped, and the mixture has been placed in a mold and cooled. This process produces a solid composition that consists of mineral wax, the silica additive, and the finely divided dense metal uniformly dispersed throughout the wax.

The use of small amounts of the silica additive surprisingly obviates the problem of the dense metal settling out of the wax, and provides a substantially uniform mixture with a minimum of mixing. As a result, the solidified product provides a uniform shield for gamma and neutron radiation. Furthermore, in the presence of the silica additive a uniform dispersion of dense metal is obtained with the wax maintained over a relatively wide temperature range, thereby rendering the process practical on a large scale commercial basis. Also, the process hereof lends itself to the preparation of various shapes of shielding since the dispersion remains substantially uniform even after it has been poured into molds to cool and solidify.

Dense metals that provide shielding for gamma radiation are well known, and they are characterized by a high atomic weight and a high density. Any of such metals that provide the desired shielding effect may be employed in finely divided powder form in the shielding composition. Lead is perhaps the most commonly utilized shield for gamma rays, but it has been found that other dense metals commercially available in powder form also provide the desired gamma ray shielding when dispersed in wax. Examples of such other metals are tungsten and bismuth. Consequently, for the shielding composition hereof, a dense metal is utilized that is selected from the group consisting of lead, tungsten and bismuth.

In order to provide a dispersion of dense metal in wax that will be uniform and have a high effectiveness in stopping gamma rays, the dense metal is employed in the form of small particles. A wide range of particle sizes may be utilized. This range may vary from a minimum of a few microns in diameter, or in other words with all of the dense metal passing through a 325 mesh sieve, to particles the size of small shot, or in other words granules that pass through a 20 mesh sieve and are retained on a 40 mesh sieve. All sieve sizes referred to herein are U.S. Sieve Series. The smaller sizes of the dense metal are preferred, since a fine powder is easier to disperse uniformly in the wax, and provides a more effective shield against gamma radiation. If the dense metal is employed in particles that are retained on a 20 mesh screen, or larger, it is difficult to disperse the metal in the wax and the resultant product contains gaps that may permit passage of gamma rays. For example, particularly excellent results as to dispersion of the dense metal in the wax have been obtained with a dense metal in which 99 percent passes through an 80 mesh sieve, 72 percent through a 200 mesh sieve, and 44 percent through a 325 mesh sieve.

The wax present in the shielding composition provides an excellent shielding for neutrons. Mineral waxes are inexpensive and efficient neutron absorbers because of their high hydrogen content, and they are particularly suitable for use in the dense metal-wax shielding composition. Such mineral waxes may be either paraffin wax or microcrystalline wax. Paraffin wax is defined chemically as essentially straight chain paraffin hydrocarbons in the molecular weight range of about 300 to about 500. Depending upon the proportions of hydrocarbons of different molecular weight, the melting point of paraffin waxes varies from about 50° C. to 75° C. or even higher. Microcrystalline waxes are principally branch chain or iso-paraffins, but contain some straight chain paraffins and some naphthene hydrocarbons. The molecular weight of microcrystalline waxes is generally between about 600 to 900, and pure microcrystalline waxes have a melting point range that is usually from 5° C. to 25° C. higher than paraffin waxes. Since both of such waxes are excellent neutron absorbers and since powdered dense metals can be dispersed in such waxes to form the shield for gamma rays and neutrons, waxes selected from the group consisting of paraffin waxes and microcrystalline waxes are utilized in the shielding composition.

The silica additive hereof surprisingly results in the provision of a viscous uniform dispersion of the dense metal in a wax over a relatively wide temperature range of the molten wax without appreciable settling of the dense metal. The silica additive is employed in the form of a finely divided solid, and the additive is selected from the group consisting of silica, group II metal silicates, group III metal silicates, group IV metal silicates, and mixtures thereof. The groups refer to periodic system groups. Silicates of groups other than groups II, III and IV do not provide the desired suspending effect. The silica may be in the form of anhydrous or hydrous silica aerogels. Suitable metallic silicates include calcium silicate, aluminum silicate, magnesium silicate, lead silicate, strontium silicate, barium silicate, zinc silicate, cadmium silicate and tin silicate.

The silica or metallic silicate additive is preferably employed in the form of a finely divided powder for increased efficiency in providing the uniform dispersion of metal in wax. A wide range of particle sizes are effective. For example, the size of additive that may be employed varies from the submicroscopic fineness of about 0.01 micron possessed by silica aerogels, up to about 45 micron size silicates that just pass through a 325 mesh screen. As a general rule, the finer the particle size the better the effectiveness of the additive, and the major part of the additive should pass through a 325 mesh screen.

A wide range of proportions of dense metal to wax may be employed in the shielding composition. The amount of the dense metal may vary from about 50 percent by weight to as high as about 90 parts by weight based on the total weight of metal and wax in the mixture. In other words, the amount of wax may vary between about 50 percent by weight and about 10 percent by weight of the metal and wax. If less than 50 percent by weight of dense metal is used, the ability of the shielding composition to absorb gamma rays is so diminished that relatively thick shields must be utilized for effective results. The maximum proportion of dense metal is dependent upon the requirement that there be sufficient melted wax to provide a flowable mass in which the metal is dispersed. In actual practice the ratio of metal to wax will vary between the limits specified, and the specific ratio utilized will depend upon the density of the radiation shielding material desired. For high gamma ray fluxes, a shield incorporating a high ratio of metal to wax is desirable. On the other hand, with increasing neutron emission in proportion to the amount of gamma rays, a shield incorporating a high proportion of wax relative to the heavy metal is desirable.

The proportion of the silica or metallic silicate additive varies slightly depending upon its chemical composition and the effectiveness desired in producing a uniform dispersion. Best results are obtained when the amount of silica or metallic silicate additive is between about 1 percent to 5 percent by weight based on the weight of the wax and silica additive in the composition. If less than about 1 percent is employed, very little improvement is obtained in providing the desired uniform dispersion of dense metal in wax. On the other hand, if more than about 5 percent of the silica or metallic silicate is incorporated in the mixture of dense metal and molten wax, a composition that is too thick is obtained which is difficult to stir or agitate and difficult to pour into a mold to provide the desired shape of shielding construction. In addition to the wax, dense metal and silica or metallic silicate additive, other compounds, such as polyethylene that are compatible with the wax may, of course, be incorporated in the mixture.

The solid radiation shielding composition hereof is prepared by melting the wax and adding to it with agitation the finely divided silica additive and the dense metal. Best results in obtaining a uniform dispersion with a minimum of agitation are obtained when the silica or metallic silicate is added to the wax prior to addition of the dense metal. If the dense metal is added prior to addition of the dry silica or silicate, it is very difficult to obtain the desired mechanical dispersion and a great deal of agitation is required. Consequently, in the preferred procedure, the silica or silicate is added to the melted wax, the mixture is agitated to disperse the silica in the wax, and then the powdered metal is added slowly to the mixture of wax and silica or silicate additive, maintaining good agitation and holding the temperature high enough to keep the wax melted.

During addition of the dense metal, the temperature of the wax is maintained between the lowest temperature in the melting point range up to as much as 15° C. above the melting point range. Best results are obtained when the wax is within the melting point range since it is very viscous at that temperature and provides for ready dispersion of the metal. However, with the silica or metallic silicate additive, uniform dispersions are also readily obtained when the dense metal is added to wax within as much as 15° C. above the melting point range. If the temperature is maintained appreciably higher than 15° C. above the melting point range of the wax, it is extremely difficult to obtain a uniform dispersion of the metal in wax, and the dense metal tends to settle to the bottom of the container.

After the metal has been dispersed to the point at which a smooth composition has been provided in which the metal is suspended by a viscous wax, the mixture is poured into containers or molds at a temperature between the melting point range of the untreated wax and 15° C. above the melting point range. In this connection the paraffin waxes and microcrystalline waxes employed in forming the shielding composition hereof do not have exact melting point ranges, but they melt over a range of temperatures. When the dispersed metal and wax composition is cooled in the mold, the composition congeals to a solid mass in which the metal is uniformly distributed in the wax. In the absence of the silica or metallic silicate additive hereof, the dense metal settles out rapidly during the congealing process before solidification of the wax can proceed to completion.

Any type of equipment may be employed for dispersing the metal powder and the silica or silicate additive in the melted wax prior to pouring the mixture in a mold. The essential requirements are facilities for efficient mechanical dispersion, a means for controlling the temperature above the melting point of the wax, arrangements for removal of entrained air if this is desired to produce a shielding composition without voids caused by the presence of air, and facilities for pouring the fluid mixture of metal powder and wax into molds. For example, dough mixers with sigma blades and jacketed for temperature control by steam or water are suitable for dispersing the wax.

After the mixture of dense metal, wax and silica or metallic silicate additive has been cooled to form a solid shielding composition, it consists of a uniform distribution of finely divided metal throughout the wax and includes the small increment of silica additive. When the silica or metal silicate hereof is included in the mixture, it is relatively simple to obtain a uniform dispersion of the dense metal in the wax, and there is no separation of the wax component even in thin surface layers. However, if the mixture of dense metal and wax is prepared without utilizing an additive, the dense metal tends to settle out rapidly from the thin ungelled liquid wax.

Containers into which the molten dispersion of dense metal, wax and silica or silicate additive is poured may be of any desired shape for radiation shielding purposes. Furthermore, when the container is a mold having the form of a flat slab, the solidified composition molded in such slabs can readily be sawed into bricks after cooling. Such bricks are particularly well suited for the construction of radiation shields. Thus the shielding compositions hereof are useful in the form of shielding walls or they may be poured while liquid into shaped containers for the absorption of gamma radiation and neutrons.

The finished shielding product is far less dense than a similar shield of metal, and its relatively light weight enables the shield to be easily handled in the construction of a barrier to radiation. For example, a lead-wax composition comprising 84.0 percent by weight of lead, 15.7 percent by weight of paraffin wax and 0.3 percent by weight of silica aerogel has a specific gravity of 4.0 compared to a specific gravity of 11.3 for metallic lead.

An excellent shield for both gamma rays and neutrons is provided by the composition hereof. The shielding properties of a lead-wax dispersion having the foregoing composition have been measured, and it has been found that such a lead-wax brick composition has an attenuation coefficient equal to 0.567 for gamma rays with an energy of 1.28 Mev. from a sodium-22 isotope source. The shielding power is also expressed as "mean free path for gamma radiation protection" of 10.2 centimeters. With respect to the neutron shielding effectiveness of the foregoing shielding composition, it has an attenuation coefficient equal to 0.147 for fast neutrons with an energy of from 2 to 4 Mev. from a plutonium-beryllium source. This may be expressed alternately in terms of "a mean free path for fast neutron protection" of 10.2 centimeters. The attenuation coefficients given above were determined by application of the equation (2.60.3) given on page 75 of S. Glasstone's "Principles of Nuclear Reactor Engineering."

The following are examples of the preparation of shielding compositions that provide excellent shielding against both gamma rays and neutrons:

*Example 1*

336 lbs. of paraffin wax (melting point range 62.0–65.5° C. by ASTM Method D87–42) were melted and introduced into a 100 gallon jacketed dough mixer, desiged for operation under vacuum when desired. Although the above M.P. range by ASTM specification is indicated, actual measurement in the machine showed a congealing point of 57° C. for this wax. 7 lbs. of a dry silica aerogel (manufactured under the trade name of "Santocel C" by Monsanto Chemical Company) were added and mixed into the molten wax. 1800 lbs. of finely powdered, pure lead was then added. The fineness specifications of the lead were 100 percent passing an 80 mesh sieve. Immediately after adding the lead, the mixer was closed and a vacuum of approximately 25 inches was applied to remove dissolved and occluded air from the composition. During this vacuum mixing step, the temperature was brought to 58–62° C., as measured directly in the mixer, by control with steam and water in the jacket.

The composition was then poured from the mixer into containers of special shape and into slab shaped molds having the thickness of bricks. After cooling, in the case of the slab forms one wall of the mold was removed, and while in a horizontal position, the lead-wax slab sawed into bricks of the desired size and weight.

The density of the finished shielding composition of dispersed lead in wax was about 4.0, or in other words 250 lbs. per cu. ft.

*Example 2*

7.84 lbs. paraffin wax (melting point range 71–74° C. by ASTM Method D87–42) were melted and added to a small size kinetic dispersion mill known commercially as a "Kady Mill." 0.16 lbs. silica aerogel (commercial "Santocel C") were added and dispersed in the melted wax under the high speed dispersion conditions of this mill. A very good, fluid gel was produced in the wax. The mixture was then transferred to a heated 3 gallon dough mixer. 42.0 lbs. lead powder, screen analysis—98 percent through 80 mesh, 75 percent through 200 mesh and 30 percent through 325 mesh sieves, were added slowly to the gelled wax, maintaining the temperature above 74° C.

Vacuum was applied, while agitation continued, to remove entrained air. The mass was then cooled slowly to 72° C. and poured into a wooden mold with dimensions 14 x 14 x 2 inches, the mold standing on its narrow side.

During pouring, an excellent dispersion of the lead in the wax was observed. The cooled slab, after removal from the mold, showed complete freedom from wax separation. The uniform density of the radiation shield indicated no appreciable settling of the lead.

*Example 3*

288 grams paraffin wax (melting point range 71–74° C. by ASTM Method D87–42) were melted in a two liter stainless steel beaker equipped with a toothed disc, variable speed agitator (Cowles' type). 12 grams anhydrous silica aerogel (Syloid #244, as manufactured by Columbia-Southern Chemical Corporation) were added to the melted wax at 90–100° C. with vigorous agitation. A clear, gel type of dispersion was formed. 300 grams lead powder (fineness 99.8 percent through 80 mesh, 72.1 percent through 200 mesh and 44.0 percent through 325 mesh sieve) were added slowly to the thick melted wax, maintaining vigorous agitation. The temperature of the mixture was allowed to drop slowly to the 70–75° range. An excellent, uniform dispersion of the lead was obtained. The mixture was poured into a metal container at 72° C. On cooling, no formation of a separate wax phase and no settling of the lead were observed.

The proportions of ingredients by weight used in this experiment were lead 50 percent, wax 48 percent and silica 2 percent. The excellent dispersion obtained indicates clearly that a composition containing a ratio of lead to wax of at least 50/50 may be used satisfactorily in the process.

*Example 4*

98 grams paraffin wax (same as in Example 3) were melted in the apparatus described in Example 3. 2 grams anhydrous silica aerogel (Syloid #244) were dispersed in the melted wax with rapid agitation. A noticeable gel formation occurred, although it was not as viscous as in Example 3, due to the lower concentration of the silica. 900 grams of lead powder (fineness as in Example 3) were added slowly at 85–90° C. The temperature was then allowed to drop slowly maintaining high speed agitation and taking care that circulation was good in the entire mass. The mixture, which was very thick but flowable, was poured at 72–74° C. into a metal container. Dispersion of the lead was excellent. On cooling, there was no wax separation and no appearance of settling of the lead.

The excellent results obtained in this experiment indicate that a radiation shielding composition containing a ratio of lead to wax as high as 90 parts to 10 by weight can be satisfactorily prepared by this process.

*Example 5*

144 grams paraffin wax (same as in Example 3) were melted in the apparatus described in Example 3. 6 grams calcium silicate (finely divided product available under the commercial name of "Silene") were added to the melted wax. The dispersion conditions produced an observable gelling of the wax, even as high as 90–95° C. 600 grams lead powder (fineness as in Example 3) were then added, after which the temperature was allowed to drop slowly maintaining good agitation. The mixture was poured at 71–72° C. A uniform dispersion of metal was obtained from which, after cooling, no settling or wax separation was observable.

*Example 6*

147 grams microcrystalline wax (known commercially as "Chevron Slack Wax," containing 20 percent mineral oil) with a melting point of 66–67° C. (ASTM–D127 Method) were melted in the apparatus described in Example 3. 6 grams calcium silicate ("Silene") were dispersed in the melted wax. 600 grams lead powder (fineness as in Example 3) were added within the temperature range of 80–85° C. in the mixture.

After letting the temperature drop slowly, maintaining good agitation, the mixture was poured into a mold at 65–67° C. The dispersion of the lead was uniform and, on cooling, there was no observable settling of metal nor separation of wax in the final radiation shielding composition.

*Example 7*

110.3 grams paraffin wax (same as in Example 3) were melted in the apparatus described in Example 3. 4.5 grams aluminum silicate (colloidal, hydrous) were added to the melted wax at 90–95° C. The material used was the commercial product known as "Permagel," as manufactured by Minerals and Chemicals Corporation of America. It is a colloidal form of fuller's earth and contains magnesium silicate in addition to aluminum. 637.5 grams lead powder (fineness as in Example 3) were added at 85–90° C. After slow cooling with good agitation the mixture was poured at 72° C. The lead was very well dispersed and, after cooling, there was no wax separation nor lead settling.

*Example 8*

145.5 grams microcrystalline wax (oil free), as manufactured by General Petroleum Corporation, M.P. 77° C. were melted in the apparatus described in Example 3. 4.5 grams hydrous silica powder (a commercial product manufactured by Columbia-Southern Chemical Corporation under the name "Hi-sil" #233) were added to the wax at 100–110° C. with vigorous agitation. 600 grams lead powder (fineness as in Example 3) were added at 90–100° C.

After slow cooling with vigorous agitation the mixture was poured at 77–78° C. An excellent dispersion of the metal was obtained and the cooled mixture provided a radiation shield having no separation of wax nor settling of lead.

*Example 9*

142.5 grams microcrystalline wax (oil free), as used in Example 8, were melted in the apparatus described in Example 3. 7.5 grams lead silicate powder of pigment fineness (commercially produced by the Evans Lead Company) were added to the wax at 100–110° C. with good agitation. A noticeable increase in viscosity was observed. The lead silicate was substantially a normal salt, having the composition PbO 85.0, SiO₂ 15.0 percent. 600 grams lead powder (fineness as in Example 3) were added slowly at 90–100° C. with good agitation.

The mix was allowed to cool slowly, maintaining the agitation, and poured at 78–80° C. As with the other metallic silicates, an excellent dispersion of the lead was obtained. On cooling, the poured material showed no wax separation nor settling of the lead.

*Example 10*

This example demonstrates the ability of a properly gelled paraffin wax to suspend very coarse lead particles.

74.9 grams paraffin wax (as in Example 3) were melted in the apparatus used in Example 3. 3.2 grams anhydrous silica aerogel ("Syloid" #244) were added to the melted wax at 110–120° C. with good agitation. An excellent, very viscous gel was formed. 446 grams lead "Shot" (manufactured by the Division Lead Co.), having a size range passing 20 mesh but retained on a 40 mesh sieve, were added to the gelled wax at 90–100° C.

The mixture, after slow cooling with vigorous agitation, was poured at 74–75° C. On solidification to form a solid radiation shielding composition, there was no wax separation and settling of the shot was not appreciable.

*Example 11*

This example shows the equivalence of tungsten to lead as to dispersion and suspension of the powder forms in gelled paraffin wax.

131 grams paraffin wax (as in Example 3) were melted in the apparatus of Example 3. 2.65 grams silica aerogel ("Santocel C") were added to the wax at 90–100° C. 200 grams tungsten powder (Type M-60 as manufactured by Sylvania Electric Products, Inc.) were added at 80–90° C., maintaining vigorous agitation. The average particle size of the tungsten was 6 microns (100 percent passing 325 mesh sieve size) and its purity was 99.75 percent.

After cooling slowly with good agitation the mixture was poured at 72–74° C. An excellent dispersion of the tungsten metal was obtained. On solidification, there was no wax separation and only a minor amount of settling of this very heavy metal (specific gravity 19.3, compared to 11.3 for lead).

*Example 12*

This example demonstrates the equivalence of bismuth to lead, as to dispersion and suspension in gelled paraffin wax. 82.4 grams paraffin wax (as in Example 3) were melted in the apparatus of Example 3. 3.4 grams anhydrous silica aerogel ("Syloid" #244) were added to the melted wax while at 100–110° C. with vigorous agitation thereby providing a thick fluid gel. 200 grams bismuth powder, 100 mesh in particle size (as produced by A. D. Mackay, Inc.) were added at 90–100° C. The mix was cooled slowly, maintaining good agitation, and poured at 75–76° C.

A good dispersion of the metal was produced. On solidification of the mixture, good suspension of the metal was evident with no separation of wax.

We claim:

1. The method of preparing a solid radiation shielding composition which comprises mixing a finely divided dense metal selected from the group consisting of lead, tungsten, bismuth, and mixtures thereof; a molten wax selected from the group consisting of paraffin wax, microcrystalline wax, and a mixture thereof; and a finely divided, additive selected from the group consisting of silica, a Group II metal silicate, aluminum silicate, lead silicate, tin silicate and mixtures thereof; said dense metal being present in the amount of between about 50 to about 90 percent by weight based on the total weight of dense metal and said wax in the composition; and said additive comprising between about 1 percent and 5 percent by weight of the total weight of said wax and said additive; continuing said mixing while said wax is in molten condition to provide a substantially anhydrous uniform dispersion of said dense metal in said molten wax and said additive; and cooling said liquid dispersion to provide a solid radiation shielding composition.

2. The method of preparing a solid radiation shielding composition which comprises mixing a finely divided dense metal selected from the group consisting of lead, tungsten, bismuth, and a mixture thereof; a molten wax selected from the group consisting of paraffin wax, microcrystalline wax, and mixtures thereof; and a finely divided additive selected from the group consisting of silica, a Group II metallic silicate, aluminum silicate, lead silicate, tin silicate, and mixtures thereof; said dense metal being present in the amount of between about 50 to about 90 percent by weight based on the total weight of dense metal and said wax in the composition; and said additive comprising between about 1 percent and 5 percent by weight of the total weight of said wax and said additive; maintaining the temperature of said wax during said mixing between the lowest point in the melting point range of said wax and about 15° C. above the upper point in the melting point range; continuing said mixing while said wax is in a molten condition to provide a substantially anhydrous uniform dispersion of said dense metal in said molten wax and said additive; pouring said dispersion into a mold while said wax is molten, and cooling said liquid dispersion to provide a solid radiation shielding composition.

3. The method of claim 2 in which said additive is mixed with said molten wax before said dense metal is intermixed to provide the dispersion of dense metal in wax.

4. The method of claim 2 in which the dispersion of dense metal in molten wax and additive is subjected to a partial vacuum to remove entrained air and obviate voids in the final solid radiation shielding composition.

5. A solid radiation shielding composition which comprises a substantially uniform dispersion of a finely divided dense metal selected from the group consisting of lead, tungsten, bismuth, and mixtures thereof; a wax selected from the group consisting of paraffin wax, microcrystalline wax, and a mixture thereof; and a finely divided additive selected from the group consisting of silica, a Group II metal silicate, aluminum silicate, lead silicate, tin silicate, and mixtures thereof; said dense metal being present in the amount of between about 50 to about 90 percent by weight based on the total weight of dense metal and said wax in the composition; and said additive comprising between about 1 percent and 5 percent by weight of the total weight of said wax and said additive.

6. The method of shielding an area against gamma rays and neutrons which comprises placing the solid composition of claim 5 between said area and the source of said gamma rays and neutrons.

References Cited in the file of this patent
UNITED STATES PATENTS

| | | |
|---|---|---|
| 2,263,070 | Cusick | Nov. 18, 1941 |
| 2,292,047 | Calhoun | Aug. 4, 1942 |
| 2,462,018 | Wood | Feb. 15, 1949 |
| 2,716,705 | Zinn | Aug. 30, 1955 |
| 2,754,206 | Olson | July 10, 1956 |